US010200147B2

(12) United States Patent
Cariou et al.

(10) Patent No.: US 10,200,147 B2
(45) Date of Patent: Feb. 5, 2019

(54) SENDING FEEDBACK IN A HIGH EFFICIENCY SERVICE FIELD

(71) Applicant: Intel IP Corporation, Santa Clara, CA (US)

(72) Inventors: Laurent Cariou, Portland, OR (US); Shahar Gross, Nes-Tziona (IL); Po-Kai Huang, West Lafayette, IN (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 119 days.

(21) Appl. No.: 15/279,695

(22) Filed: Sep. 29, 2016

(65) Prior Publication Data
US 2017/0288838 A1 Oct. 5, 2017

Related U.S. Application Data

(60) Provisional application No. 62/318,469, filed on Apr. 5, 2016.

(51) Int. Cl.
H04L 5/00 (2006.01)
H04W 88/00 (2009.01)
(Continued)

(52) U.S. Cl.
CPC .......... H04L 1/0003 (2013.01); H04L 1/0028 (2013.01); H04L 1/0043 (2013.01);
(Continued)

(58) Field of Classification Search
CPC ... H04L 1/0003; H04L 1/0028; H04L 5/0057; H04L 5/0092; H04L 5/0055; H04L 1/0031; H04W 72/0453; H04W 72/0413; H04W 52/146; H04W 72/042; H04W 72/121; H04W 72/1289; H04W 74/006;
(Continued)

(56) References Cited

U.S. PATENT DOCUMENTS 9,800,501 B2 * 10/2017 Merlin .................... H04L 47/12
2016/0029373 A1 * 1/2016 Seok ..................... H04L 5/0055
370/338

(Continued)

Primary Examiner — Ahmed Elallam
(74) Attorney, Agent, or Firm — Schwegman Lundberg & Woessner, P.A.

(57) ABSTRACT

Apparatus, computer readable media, and methods are disclosed for sending feedback in a high efficiency service field. An apparatus is disclosed comprising processing circuitry configured to: decode a trigger frame from a second wireless device, wherein the trigger frame indicates a resource allocation for an uplink (UL) multi-user (MU) transmission for the first wireless device. The processing circuitry may be further configured to: determine feedback for a second wireless device based on the resource allocation. The processing circuitry may be further configured to: encode a physical layer convergence protocol (PLCP) protocol data unit (PPDU) to include a high-efficiency (HE) service field comprising the feedback in a physical (PHY) portion of the PPDU. And, the processing circuitry may be further configured to: configure the first wireless device to transmit the PPDU in accordance with the resource allocation to the second wireless device.

25 Claims, 8 Drawing Sheets

(51) Int. Cl.
*H04L 1/00* (2006.01)
*H04W 74/06* (2009.01)

(52) U.S. Cl.
CPC .......... *H04L 1/0073* (2013.01); *H04L 5/0057* (2013.01); *H04L 5/0092* (2013.01); *H04W 74/06* (2013.01)

(58) Field of Classification Search
CPC ... H04W 74/04; H04W 72/12; H04W 74/008; H04W 24/10; H04W 52/241; H04W 52/365; H04W 56/0005; H04B 7/0452; H04B 7/0417
See application file for complete search history.

(56) References Cited

U.S. PATENT DOCUMENTS

| | | | |
|---|---|---|---|
| 2016/0100396 A1* | 4/2016 | Seok | H04L 5/003 370/329 |
| 2016/0366254 A1* | 12/2016 | Asterjadhi | H04L 69/324 |
| 2017/0063509 A1* | 3/2017 | Kim | H04L 5/0055 |
| 2017/0070914 A1* | 3/2017 | Chun | H04L 1/0026 |
| 2017/0078003 A1* | 3/2017 | Ghosh | H04B 7/0452 |
| 2017/0079027 A1* | 3/2017 | Chun | H04L 1/0026 |
| 2017/0135046 A1* | 5/2017 | Sutskover | H04W 52/242 |
| 2017/0171860 A1* | 6/2017 | Park | H04W 72/0453 |
| 2017/0201956 A1* | 7/2017 | Huang | H04W 56/0005 |
| 2018/0048574 A1* | 2/2018 | Merlin | H04L 5/0007 |
| 2018/0205442 A1* | 7/2018 | Oteri | H04B 7/0417 |
| 2018/0242355 A1* | 8/2018 | Lou | H04W 72/121 |

* cited by examiner

SENDING FEEDBACK IN A HIGH EFFICIENCY SERVICE FIELD

PRIORITY CLAIM

This application claims the benefit of priority under 35 USC 119(e) to U.S. Provisional Patent Application Ser. No. 62/318,469, filed Apr. 5, 2016, which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11 ax. Some embodiments relate to methods, computer readable media, and apparatus for feedback in high efficiency (HE) services fields of frames. In some embodiments the frames are physical layer convergence protocol (PLCP) protocol data unit (PPDU).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
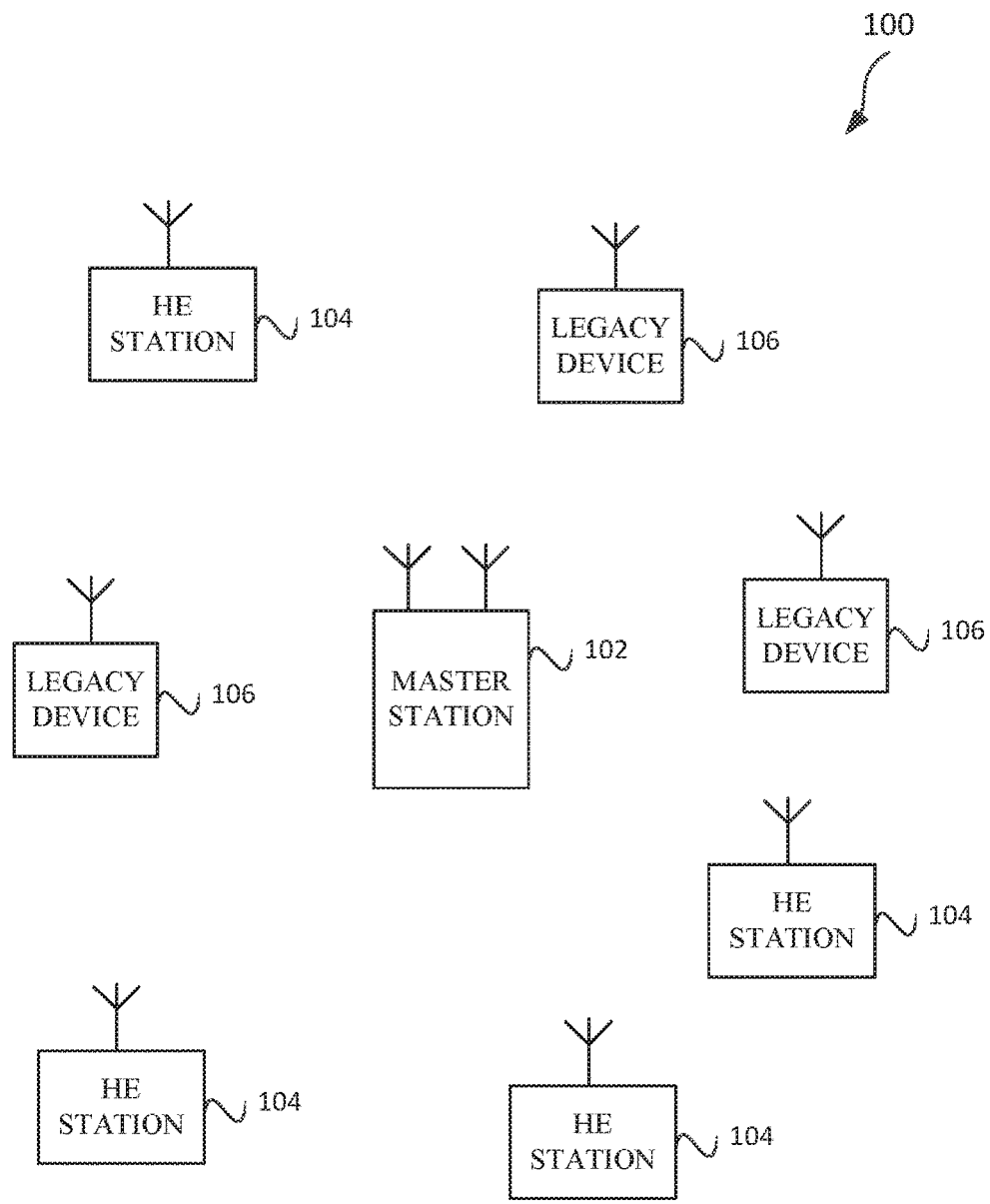
FIG. 1 illustrates a WLAN in accordance with some embodiments.

FIG. 1 illustrates a WLAN 100 in accordance with some embodiments. The WLAN 100 may comprise a basis service set (BSS) 100 that may include a master station 102, which may be an AP, a plurality of high-efficiency wireless (e.g., IEEE 802.11ax) (HE) stations 104, and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one master station 102 that is part of an extended service set (ESS). A controller (not illustrated) may store information that is common to the more than one master stations 102.

The legacy devices 106 may operate in accordance with one or more of IEEE 802.11 a/b/g/n/ac/ad/af/ah/aj/ay, or another legacy wireless communication standard. The legacy devices 106 may be STAs or IEEE STAs. The HE STAs 104 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 104 may be termed high efficiency (HE) stations.

The master station 102 may communicate with legacy devices 106 in accordance with legacy IEEE 802.11 communication techniques. In example embodiments, the master station 102 may also be configured to communicate with HE STAs 104 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU).

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

A HE frame may be configured for transmitting a number of spatial streams, which may be in accordance with MU-MIMO and may be in accordance with OFDMA. In other embodiments, the master station 102, HE STA 104, and/or legacy device 106 may also implement different technologies such as code division multiple access (CDMA) 2000, CDMA 2000 IX, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and sub-channel information. During the HE control period, HE STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a sub-channel smaller than the operating range of the master station 102. During the HE control period, legacy stations refrain from communicating. The legacy stations may need to receive the communication from the master station 102 to defer from communicating.

In accordance with some embodiments, during the TXOP the HE STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The master station 102 may also communicate with legacy stations 106 and/or HE stations 104 in accordance with legacy IEEE 802.11 communication techniques. In some embodiments, the master station 102 may also be configurable to communicate with HE stations 104 outside the HE TXOP in accordance with legacy IEEE 802.11 communication techniques, although this is not a requirement.

In some embodiments the HE station 104 may be a "group owner" (GO) for peer-to-peer modes of operation. A wireless device may be a HE station 102 or a master station 102.

In some embodiments, the HE station 104 and/or master station 102 may be configured to operate in accordance with IEEE 802.11mc.

In example embodiments, the HE station 104 and/or the master station 102 are configured to perform the methods and functions described herein in conjunction with FIGS. 1-8.

Figure 2:
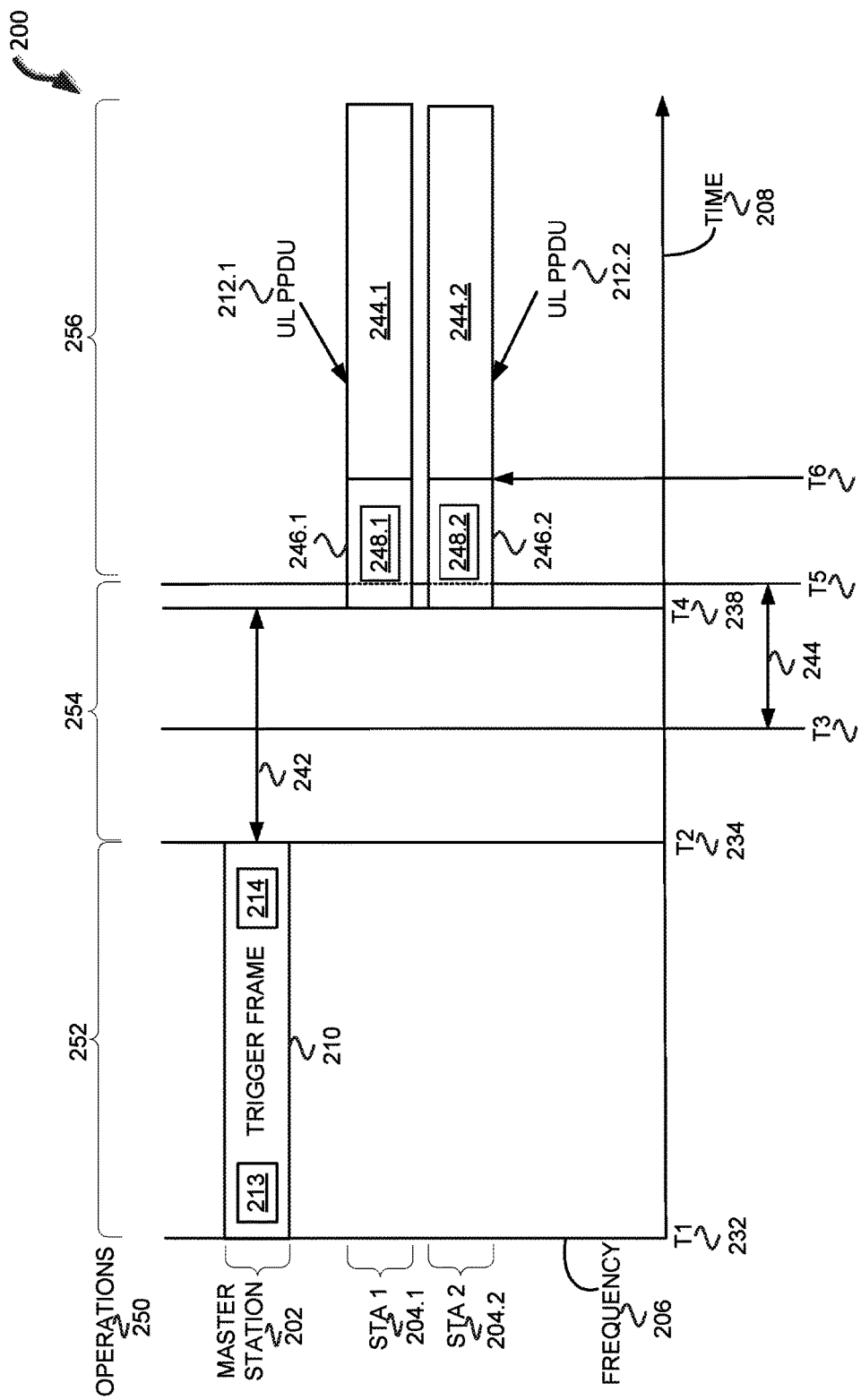
FIG. 2 illustrates a method of sending feedback in a service field in accordance with some embodiments.

FIG. 2 illustrates a method 200 of sending feedback in a service field 248 in accordance with some embodiments. Illustrated in FIG. 2 is frequency 206 along a vertical axis, time 208 along a horizontal axis, master station 204, STA1 204.1, STA2 204.2, trigger frame 210, UL PPDUs 212, and operations 250 along the top.

The frequency 206 may be a frequency band. Master station 202 and STAs 204 may transmit on resource units (RU)s. The RUs of the STAs 204 and the RU of the master station 202 may overlap. The master station 202 may be a master station 102. STA1 204.1 and STA2 204.2 may be HE stations 104.4.

The trigger frame 210 may include a feedback indicator 213 and a resource allocation 214 for an UL MU transmission of the UL PPDUs 212. The feedback indicator 212 may indicate to the STAs 204 whether they are to provide feedback 212 or not to the master station 202.

The resource allocation 214 may include a common information part and a per user information part. In some embodiments, the common information part may include a length subfield that indicates the value that the STAs 204 should use in the L-SIG length field of the HE trigger-based PPDU. In some embodiments, the common information may include an indication of duration the STAs 204 may use to transmit UL data to the master station 202. The common information may include a type of trigger frame, e.g., basic trigger, beamforming report poll trigger, MU-block acknowledgement response (MU-BAR), MU request to send (MU-RTS), or another type of trigger frame.

In some embodiments, the per user information may include one or more of the following a modulation and coding scheme (MCS), RU allocation, user identification, an indication of whether to use dual carrier modulation, a spatial stream allocation, a target received signal strength indicator (RSSI), and one or more additional fields. The master station 204 may indicate Tx power to use for a MCS, in accordance with some embodiments.

Figure 3:
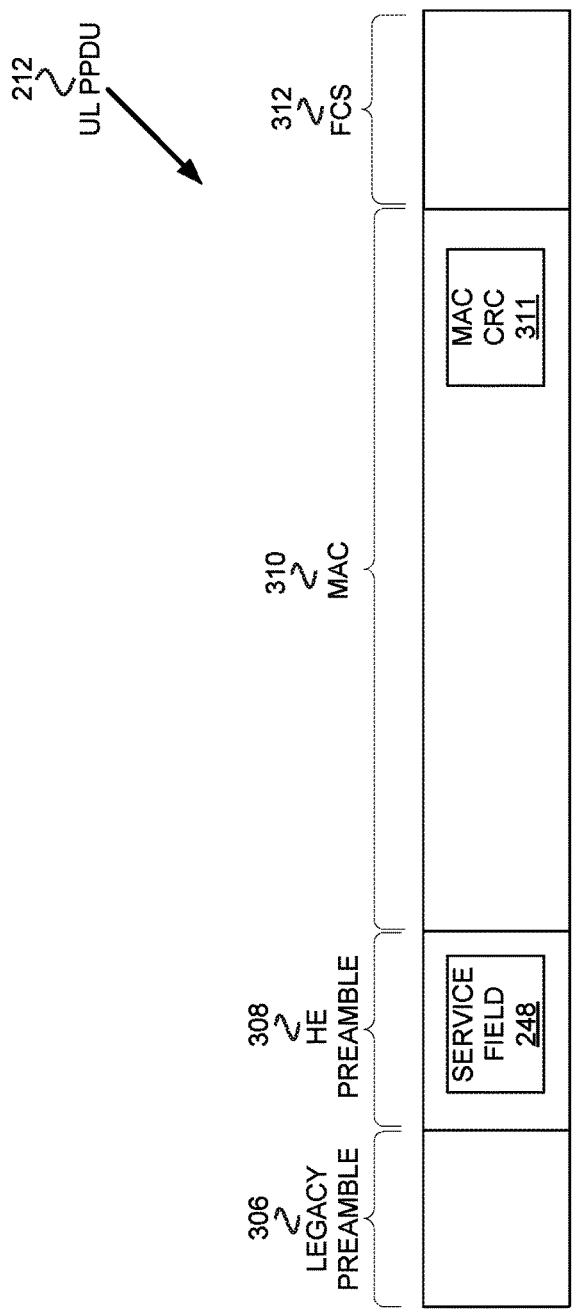
FIG. 3 illustrates an uplink (UL) PPDU in accordance with some embodiments.
Figure 4:
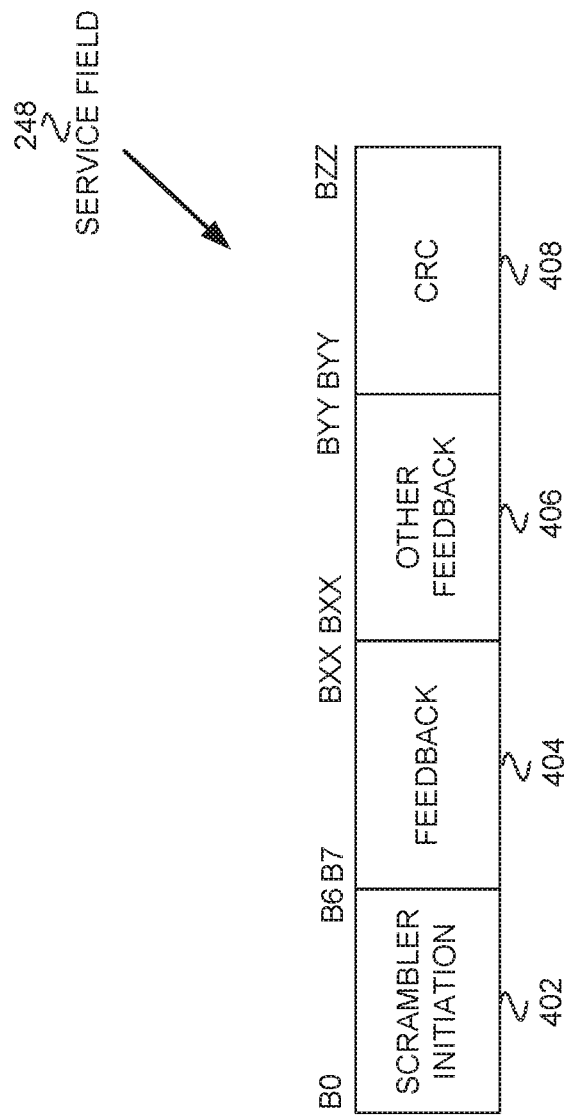
FIG. 4 illustrates a service field in accordance with some embodiments.

FIGS. 3 and 4 will be described in conjunction with FIG. 2. FIG. 3 illustrates an uplink (UL) PPDU 212 in accordance with some embodiments. Illustrated in FIG. 3 is a legacy preamble 306, HE preamble 308, media access control (MAC) 310 portion, and a frame check sequence (FCS). The UL PPDU 212 may be a UL trigger-based (TB) PPDU, in accordance with some embodiments. The legacy preamble 306 may include one or more legacy fields, e.g., a legacy (L) short training field (L-STF), a L long training field (L-LTF), a L signal (L-SIG) field, and a repeated (R) L-SIG (RL-SIG). In some embodiments, the legacy preamble 306 may indicate the type of PPDU, e.g. UL TB PPDU. The legacy preamble 306 may indicate that the UL PPDU 212 is a HE UL PPDU. The HE preamble 308 may include a service field 248 and one or more fields, e.g., HE-SIG-A, HE-STF, and HE-LTF. The service field 248 is disclosed in conjunction with FIG. 4. The service field 248 may be part of a physical (PHY) portion of the UL PPDU 212. In some embodiments, the service field 248 may be a pre-modulated HE field. In some embodiments, the service field 248 may be before a HE-STF field and HE-LTF field. In some embodiments, the service field 248 may be a HE-SIG-C field.

The MAC 310 field may include data from the STA 204 for the master station 202. The MAC 310 may include a MAC CRC 311 field to detect and, in some embodiments, correct errors. The MAC CRC 311, in some embodiments, may need to be computed after the MAC 310 is encoded. The MAC 310 may be encoded in accordance with resource allocation 214. The FCS 312 may include information for detecting errors and, in some embodiments, correcting errors in the reception of the UL PPDU 212.

FIG. 4 illustrates a service field 248 in accordance with some embodiments. The service field 248 may comprise a scrambler initiation 402, feedback 404, other feedback 408, and CRC 408. Table 1 describes the fields of the service field 248. In some embodiments, the service field 248 does not include one or more of the fields illustrated in FIG. 4. In some embodiments, the service field 248 may include additional fields. In some embodiments the service field 248 may be 16 bits or 32 bits. The scramble initiation 402 may be 7 bits long, in accordance with some embodiments. The scrambler initiation 402 may an initialization for a scrambling of the bits during encoding of the UL PPDU 212.

TABLE 1

Service Field

| Bits | Field | Description |
|---|---|---|
| B0-B6 | Scrambler Initiation | Set to 0 |
| B7-Bxx | Feedback, which in some embodiments is Headroom | Set to the headroom value for the MCS used in the current UL PPDU transmission |
| Bxx-Byy | Other feedback | |
| Byy-Bzz | CRC | Computed based on the different fields in the HE service field to perform validity check |

The feedback 404 may be one or more bits. In some embodiments, the feedback may be a headroom. In some embodiments, the feedback 404 may be an integer number that is an index into a table indicating a range of headrooms. In some embodiments, the feedback 404 may be a MCS recommendation to the master station 202 for a next MU UL PPDU transmission. In some embodiments, the feedback 404 may be a receiver quality indicator on one or more previous DL PPDUs the STA 204 received. The feedback 404 may be a recommendation for a RU to use for the STA 204 in an DL and/or UL transmission/reception. For example, the STA 204 may determine that a different RU provides better reception based on a SNR of received DL PPDUs and encode an indication of the different RU in the feedback 404. The feedback 404 may be for power adaptation. The feedback 404 may include a RU and/or a SS indication for use by the master station 202 in a DL transmission.

The other feedback 406 may be additional feedback. The CRC 408 may be a CRC for one or more of the fields of the service field 248. The feedback 404 may be computed or determined based on how the trigger frame 210 was received and/or one or more fields of the trigger frame 210. In addition or alternatively, the feedback 404 may be based on frames received prior to the trigger frame 210 and/or one or more fields from received from frames received prior to the trigger frame 210.

The STAs 204 may determine how the trigger frame 210 was received by the STA 204 based on determining one or more of a received power of trigger frame 210, a gain of the trigger frame 210, a phase of the trigger frame 210, a signal to noise ratio (SNR) of the received trigger frame 210, and an effective SNR.

Returning to FIG. 2, the method 200 may begin at operation 252 with the master station 202 transmitting trigger frame 210. The STAs 204 may begin receiving the trigger frame 210 at time T1 232 and finish receiving the trigger frame 210 at time T2 234. T1 232 and T2 234 may be different for STA 1 204.1 and STA 204.2 because of delays in receiving the trigger frame 210. Moreover, the STAs 204 may have different processing speeds and/or utilization, which may make some of the times in FIG. 3 different for different STAs 204.

The method 200 continues at operation 254 with the STAs 204 determining and encoding the service field 248 for the master station 202 in the UL PPDUs 212. In some embodiments, if a feedback indicator 213 indicates that the STAs 204 should not provide feedback, then the STAs 204 will not provide feedback.

The STAs 204 may have fixed time to respond to the trigger frame 210. For example, the STAs 204 may have to begin transmitting their response UL PPDUs 212 by time T4 238. The fixed time to respond may be from T2 234 (the end of receiving the trigger frame 210) to T4 238, which may be a short interframe space (SIFS) 242 amount of time. In some embodiments, the fixed time to respond may be different than a SIFS amount of time.

The UL PPDU 212 may be a format of a PPDU that is for responding to trigger frames 210 for UL transmissions. T5 240 may be the last time that the STAs 204 can wait before transmitting the feedback 248. The STAs 204 may begin transmitting the UL PPDUs 212 before finishing encoding the feedback 248 in the UL PPDU 212. In some embodiments, the feedback 248 may be in a PHY portion of the UL PPDU 212, e.g., HE preamble 308 (see FIG. 3).

In some embodiments, T3 236 is the time when the STAs 204 have finished decoding the trigger frame 210 and determined one or more parameters from the trigger frame 210. For example, a MCS indicated in the trigger frame 210 for the STAs 204 to use to transmit the UL PPDUs 212 and/or a target RSSI. In some embodiments, T3 236 to T5 240 may be the time needed for the STAs 204 to determine or compute the service field 248. In some embodiments, T3 236 to T5 240 may be the maximum amount of time the STA 204 has to determine or compute the service field 248.

The trigger frame 210 may indicate a MCS to use to encode and transmit the UL PPDU 212. The trigger frame 210 may indicate a Tx power the STA 204 is to use to transmit the UL PPDU 212. The Tx power for the STA 204 to use to transmit the UL PPDU 212 may be based on the MCS.

The feedback 404 may be an indication of how much the transmit (Tx) power could be increased by the STA 204 to transmit the UL PPDU 212 with the current MCS indicated in the trigger frame 210 while the STA 204 is still being within error vector magnitude (EVM) requirements. The STA 204 may also have a maximum Tx power, and the feedback 404 may be further based on the STA's 204 maximum Tx power. The feedback 404 may indicate a number of decibels (dB) the Tx power could be increased by the STA 204 to transmit the UL PPDU 212 using the MCS indicated in the trigger frame 210. In some embodiments, the STA 204 needs to determine or compute the service field 248, which includes the feedback 404 and the CRC 408.

In some embodiments, the headroom may additionally, or in the alternative, depend on the STA 204 being co-located with another wireless standard. For example, the STA 204 may include BlueTooth® which may limit the Tx power that the STA 204 may use to transmit UL PPDU 212 to comply with one or more wireless standard requirements.

The method 200 may continue with operation 256 with the STAs 204 transmitting the UL PPDUs 212. The STAs 204 may have already started transmitting the UL PPDUs 212 in operation 254 as disclosed above. The STAs 204 may transmit a PHY portion 246 of the UL PPDUs 212 before a MAC 310 field and a FCS 312 field. T6 241 is the time 208 when the STA 204 begins transmitting the MAC 310 field. In some embodiments, an apparatus of a STA 204 performs the steps of method 200 and configures the STA 204 to transmit the UL PPDU 212. In some embodiments, an apparatus of a master station 202 performs the steps of method 200 and configures the master station 202 to transmit the trigger frame 210.

In some embodiments, the STAs 204 do not have enough time to encode the feedback 404 in the MAC 310 field of the UL PPDU 212 before the MAC 310 field has to be encoded for transmission. For example, in some embodiments, the MAC 310 is encoded with a MAC CRC 311, which takes time to compute. For feedback 404 that needs to be computed or determined after the reception of the trigger frame 210 there may not be sufficient time (T2 234 to T6 241) to determine the feedback 404 and encode the MAC 310 before the MAC 310 has to be transmitted at T6 241.

In some embodiments, the master station 202 may use the feedback 404 to determine parameters for a next UL MU transmission or a DL transmission. The service field 248 being in the PHY portion of the UL PPDU 212 gives the STAs 204 more time to determine and encode the service field 248 than if the service field 248 were in the MAC 310 of the UL PPDU 212.

Figure 5:
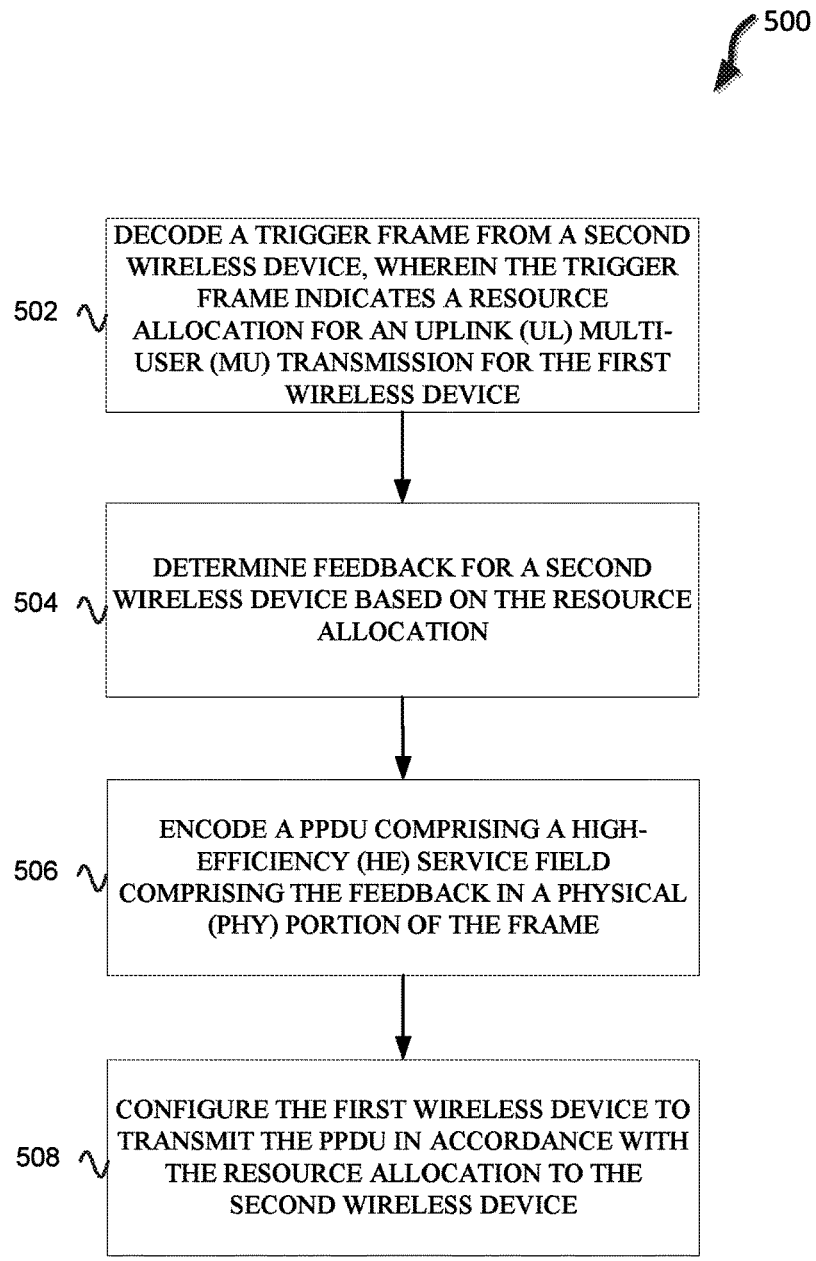
FIG. 5 illustrates a method for sending feedback in a HE service field in accordance with some embodiments.

FIG. 5 illustrates a method 500 for sending feedback in a HE service field in accordance with some embodiments. The method 500 begins at operation 502 with decoding a trigger frame from a second wireless device, wherein the trigger frame indicates a resource allocation for an UL MU transmission for the first wireless device. For example, STAs 204 may receive and decode trigger frame 210.

The method 500 continues at operation 504 with determining feedback for a second wireless device based on the resource allocation. For example, the STAs 204 may determine feedback 404 as disclosed in conjunction with FIGS. 2-4. In some embodiments, the feedback is determined based on the quality of the reception of the trigger frame.

The method 500 continues at operation 506 with encoding a PPDU comprising a HE service field comprising the feedback in a PHY portion of the frame. For example, the STAs 204 may encode the UL PPDUs 212 with the service field 248, which includes the feedback 404.

The method 500 continues at operation 508 with configuring the first wireless device to transmit the PPDU in accordance with the resource allocation to the second wireless device. For example, an apparatus of the STAs 204 may configure the STAs 204 to transmit the UL PPDUs 212. The method 500 may end.

Figure 6:
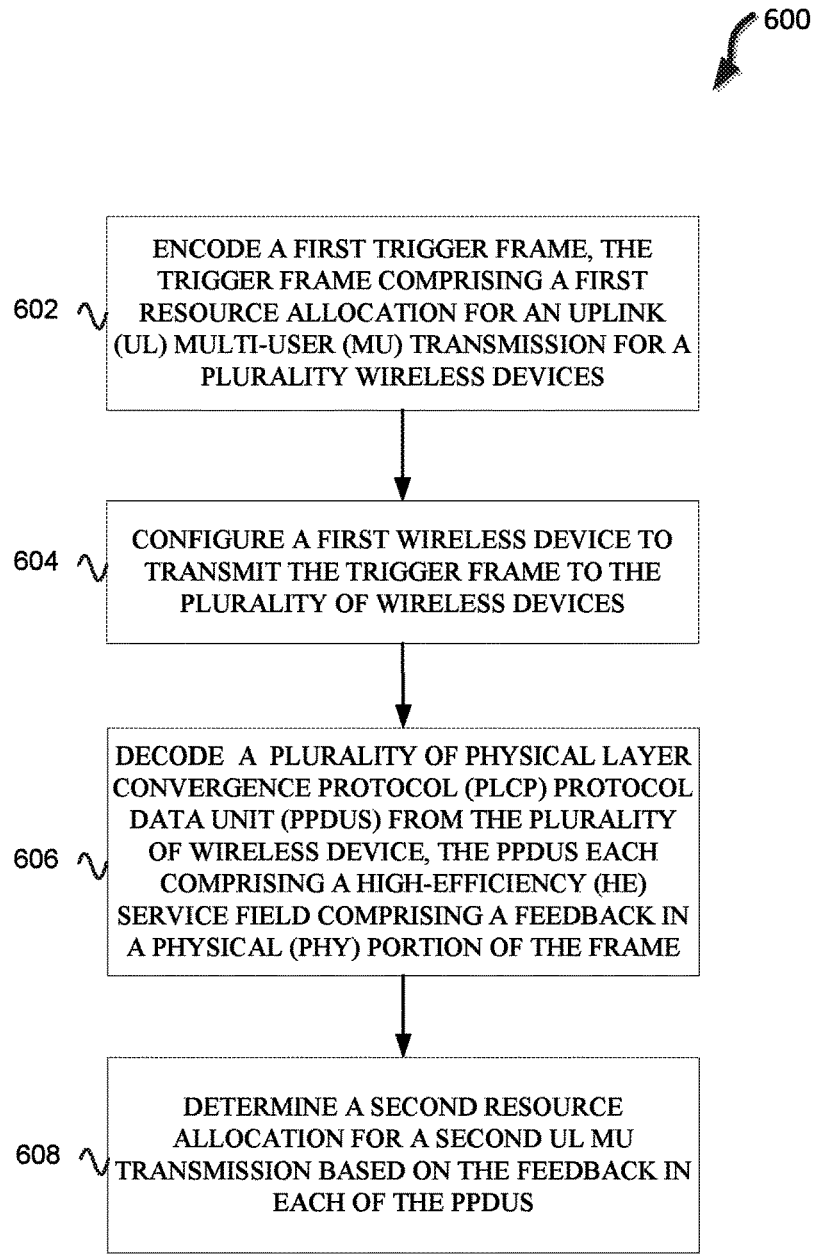
FIG. 6 illustrates a method for sending or receiving feedback in a HE service field in accordance with some embodiments.

FIG. 6 illustrates a method 600 for sending or receiving feedback in a HE service field in accordance with some embodiments. The method 600 begins at operation 602 with encoding a first trigger frame, the trigger frame comprising a first resource allocation for an uplink (UL) multi-user (MU) transmission for a plurality wireless devices. For example, master station 202 may encode transmit trigger frame 210. The method 600 continues at operation 604 with configuring a first wireless device to transmit the trigger frame to the plurality of wireless devices. For example, an apparatus of the master station 202 may configure the master station 204 to transmit the trigger frame 210.

The method 600 continues at operation 606 with decoding a plurality of PPDUs from the plurality of wireless device, the PPDUs each comprising a HE service field comprising a feedback in a physical (PHY) portion of the frame. For example, the master station 202 may decode the UL PPDUs 212 from the STAs 204. The method 600 continues at operation 608 with determining a second resource allocation for a second UL MU transmission based on the feedback in each of the PPDUs. For example, the master station 204 of FIG. 2 may be configured to determine a second resource allocation based on the service fields 248 transmitted to the master station 204. The method 600 may end.

Figure 7:
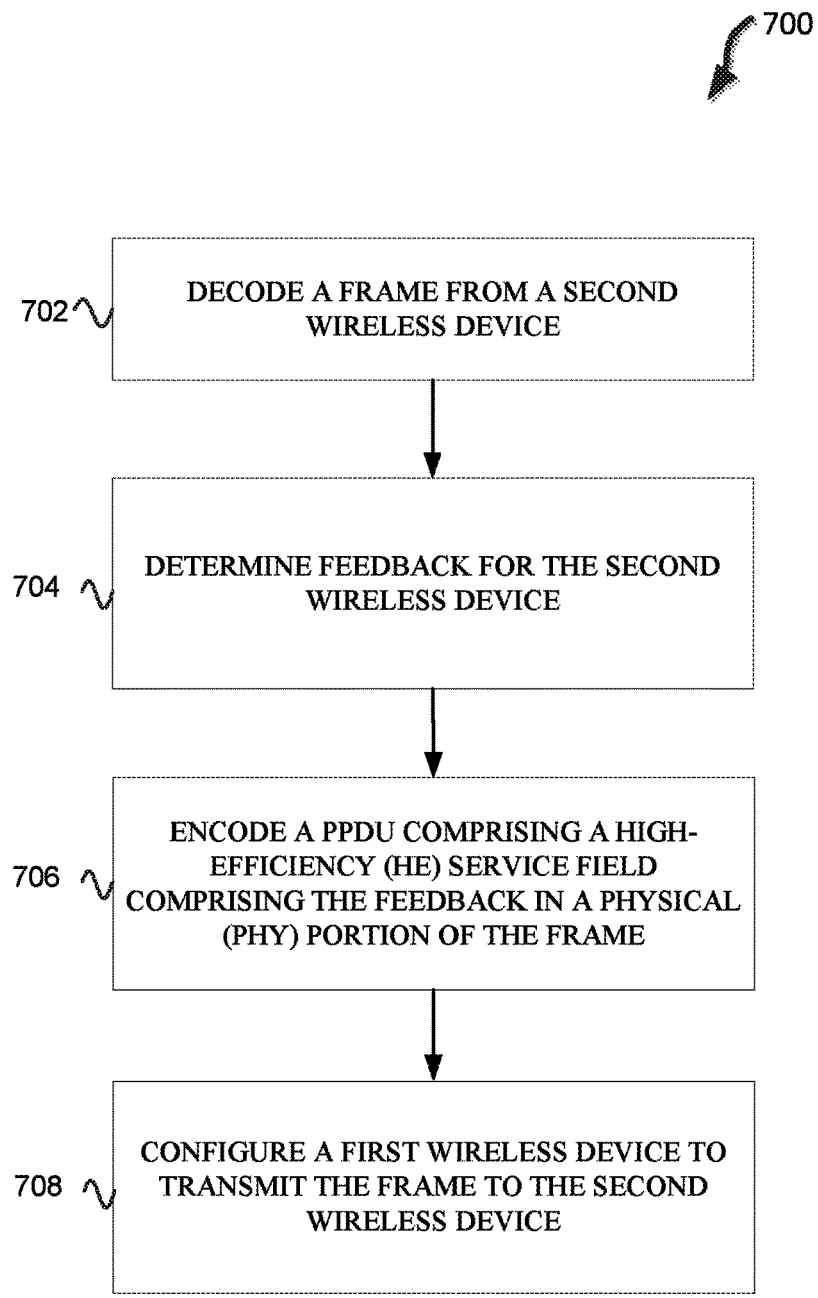
FIG. 7 illustrates a method for sending or receiving feedback in a HE service field in accordance with some embodiments.

FIG. 7 illustrates a method 700 for sending or receiving feedback in a HE service field in accordance with some embodiments. The method 700 begins at operation 702 with decoding a frame from a second wireless device. For example, STA 204.1 may decode a frame from master station 202 or STA 204.2.

The method 700 continues at operation 704 with determine feedback for the second wireless device based on the frame. For example, the feedback 404 as disclosed in conjunction with FIGS. 2-4 may be determined for the second wireless device.

The method 700 continues at operation 706 with encoding a PPDU comprising a HE service field comprising the feedback in a PHY portion of the frame. For example, STA 204 may encode a PPDU with the service field 248 as described in conjunction with FIGS. 2-4.

The method 700 continues at operation 708 with configuring a first wireless device to transmit the frame to the second wireless device. For example, an apparatus of a STA 204 may configure the STA 204 to transmit the PPDU to another STA 204 or to the master station 202. The STA 204 may have to start transmitting the PPDU at a pre-determined time after the STA 204 has finished receiving the frame, e.g. a SIFS time. The method 700 may end.

Figure 8:
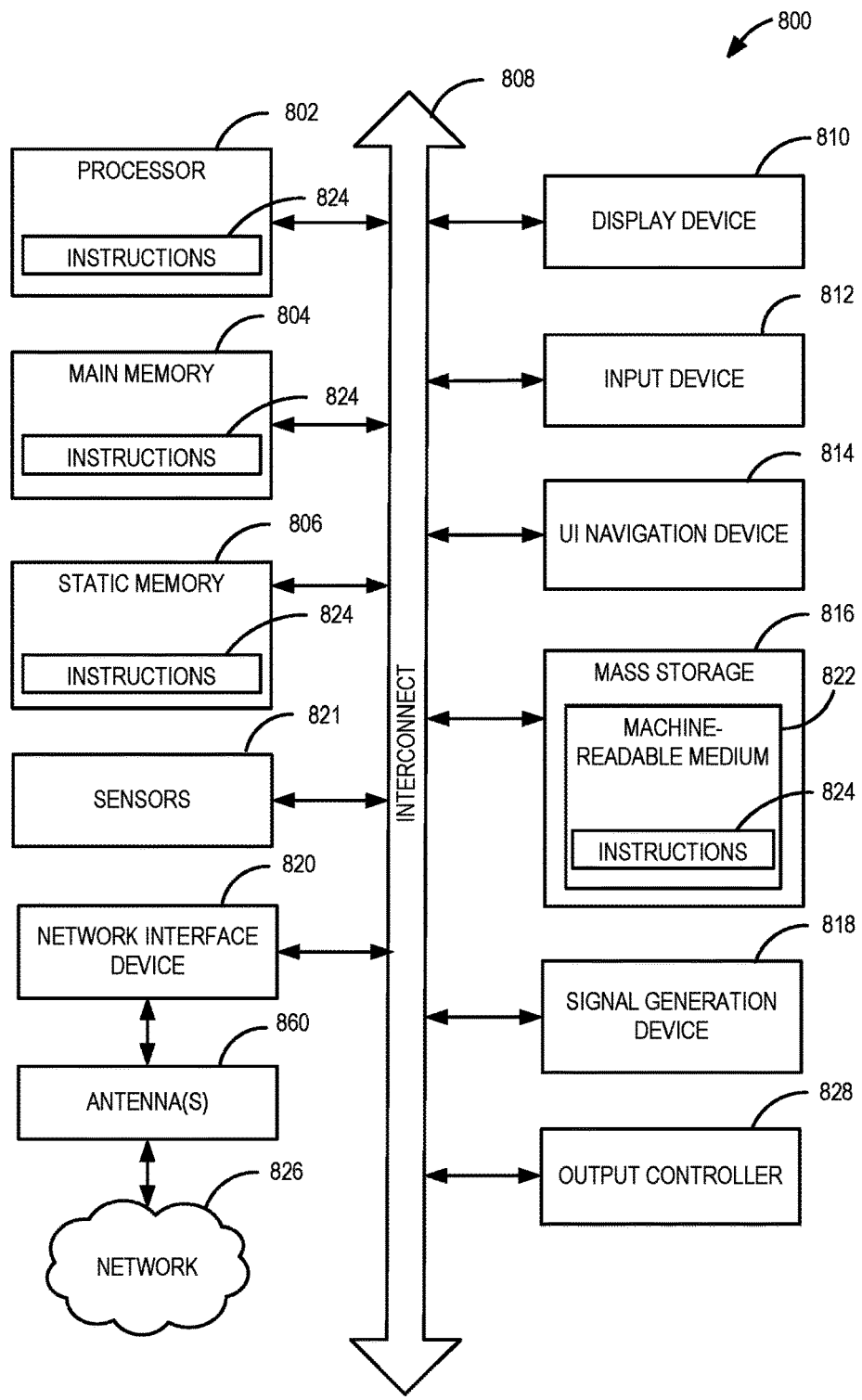
FIG. 8 illustrates a block diagram of an example machine upon which any one or more of the techniques (e.g., methodologies) discussed herein may perform.

FIG. 8 illustrates a block diagram of an example machine 800 up on which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a master station 102, HE station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display device 810, an input device 812 (e.g., a keyboard), and a user interface (UI) navigation device 814 (e.g., a mouse). In an example, the display device 810, input device 812 and UI navigation device 814 may be a touch screen display. The machine 800 may additionally include a mass storage (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 802 and/or instructions 824 may comprise processing circuitry and/or transceiver circuitry.

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

An apparatus of the machine 800 may be one or more of a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 820 may include one or more physical jacks (e.g., Ethernet, coaxial, or phone jacks) or one or more antennas to connect to the communications network 826. In an example, the network interface device 820 may include one or more antennas 860 to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques. The term "transmission medium" shall be taken to include any intangible medium that is capable of storing, encoding or carrying instructions for execution by the machine 800, and includes digital or analog communications signals or other intangible medium to facilitate communication of such software.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Example 1 is an apparatus of a first wireless device, the apparatus including: memory; and processing circuitry coupled to the memory, the processing circuitry configured to: decode a trigger frame from a second wireless device, where the trigger frame indicates a resource allocation for an uplink (UL) multi-user (MU) transmission for the first wireless device; determine feedback for the second wireless device based on the resource allocation; encode a physical layer convergence protocol (PLCP) protocol data unit (PPDU) to include a high-efficiency (HE) service field including the feedback in a physical (PHY) portion of the PPDU; and configure the first wireless device to transmit the PPDU in accordance with the resource allocation to the second wireless device.

In Example 2, the subject matter of Example 1 optionally includes where the processing circuitry is further configured to: encode the HE service field as part of a HE preamble field.

In Example 3, the subject matter of Example 2 optionally includes where the HE preamble field is a HE signal (SIG) C field, and where the HE preamble field is after a legacy preamble.

In Example 4, the subject matter of any one or more of Examples 1-3 optionally include where the processing circuitry is further configured to: determine the feedback for the second wireless device based on the quality of the reception of the trigger frame.

In Example 5, the subject matter of any one or more of Examples 1-4 optionally include where the processing circuitry is further configured to: finish encoding the HE service field after the first wireless device begins transmitting a legacy preamble portion of the PPDU.

In Example 6, the subject matter of any one or more of Examples 1-5 optionally include where the processing circuitry is further configured to: finish encoding the HE service field between a first time that is a short interframe space (SIFS) after the first wireless device finishes receiving the trigger frame and a second time that is before the first wireless device begins transmitting the HE service field.

In Example 7, the subject matter of any one or more of Examples 1-6 optionally include where the HE service field is from 3 to 8 bits in length.

In Example 8, the subject matter of any one or more of Examples 1-7 optionally include where the PPDU is an UL trigger-based (TB) PPDU.

In Example 9, the subject matter of any one or more of Examples 1-8 optionally include where the processing circuitry is further configured to: determine a cyclic redundancy code (CRC) for the HE service field and encode the HE service field to further comprise the CRC.

In Example 10, the subject matter of any one or more of Examples 1-9 optionally include where the processing circuitry is further configured to: configure the first wireless device to transmit the frame in accordance with the resource allocation a short interframe space (SIFS) after the first wireless device is to finish receiving the trigger frame.

In Example 11, the subject matter of any one or more of Examples 1-10 optionally include where the resource allocation comprises a resource unit (RU) allocation, a modulation and coding scheme (MCS), and a spatial stream (SS) allocation.

In Example 12, the subject matter of Example 11 optionally includes where the processing circuitry is further configured to: determine the feedback to be an indication of a headroom, the headroom indicating an amount of power increase the first wireless device can transmit the PPDU above an indicated transmit power using the MCS.

In Example 13, the subject matter of any one or more of Examples 11-12 optionally include where the processing circuitry is further configured to: determine the feedback to be an indication of a headroom, the headroom indicating an amount of transmit power the first wireless device can transmit the frame above an indicated transmit power using the MCS and with the amount of transmit power being within Error Vector Magnitude (EVM) requirements of the first wireless device.

In Example 14, the subject matter of any one or more of Examples 1-13 optionally include where the feedback comprises one or more of the following group: a MCS recommendation for a next UL MU transmission, a received quality of the trigger frame, a recommendation for a resource unit (RU) for a next UL MU transmission, a recommendation for the RU for a next downlink (DL) transmission to the first wireless device, the RU and scheduling information for the second wireless device to send a block acknowledgment (BA).

In Example 15, the subject matter of any one or more of Examples 1-14 optionally include where the first wireless device and the second wireless device are each one from the following group: an Institute of Electrical and Electronic Engineers (IEEE) 802.11ax access point, an IEEE 802.11ax station, an IEEE 802.11 station, and an IEEE 802.11 access point.

In Example 16, the subject matter of any one or more of Examples 1-15 optionally include where the processing circuitry is configured to: configure the first wireless device to transmit the frame in accordance with the resource allocation to the second wireless device and in accordance with one or both of orthogonal frequency division multiple-access (OFDMA) or multi-user multiple-input multiple-output (MU-MIMO).

In Example 17, the subject matter of any one or more of Examples 1-16 optionally include transceiver circuitry coupled to the processing circuitry.

In Example 18, the subject matter of Example 17 optionally includes one or more antennas coupled to the transceiver circuitry.

Example 19 is a non-transitory computer-readable storage medium that stores instructions for execution by one or more processors, the instructions to configure the one or more processors to cause an apparatus of a first wireless device to: decode a trigger frame from a second wireless device, where the trigger frame indicates a resource allocation for an uplink (UL) multi-user (MU) transmission for the first wireless device; determine feedback for the second wireless device based on the resource allocation; encode a physical layer convergence protocol (PLCP) protocol data unit (PPDU) to include a high-efficiency (HE) service field including the feedback in a physical (PHY) portion of the PPDU; and configure the first wireless device to transmit the PPDU in accordance with the resource allocation to the second wireless device.

In Example 20, the subject matter of Example 19 optionally includes where the resource allocation comprises a resource unit (RU) allocation and a modulation and coding scheme (MCS), and where the instructions further configure the one or more processor to cause the apparatus to: determine the feedback to be an indication of a headroom, the headroom indicating an amount of power increase the first wireless device can transmit the frame above an indicated transmit power using the MCS.

Example 21 is a method performed by an apparatus, the method including: decoding a trigger frame from a second wireless device, where the trigger frame indicates a resource allocation for an uplink (UL) multi-user (MU) transmission for the first wireless device; determining feedback for the second wireless device based on the resource allocation; encoding a physical layer convergence protocol (PLCP) protocol data unit (PPDU) to include a high-efficiency (HE) service field including the feedback in a physical (PHY) portion of the PPDU; and configuring the first wireless device to transmit the PPDU in accordance with the resource allocation to the second wireless device.

In Example 22, the subject matter of Example 21 optionally includes where the resource allocation comprises a resource unit (RU) allocation and a modulation and coding scheme (MCS), and where the method further comprises: determining the feedback to be an indication of a headroom, the headroom indicating an amount of power increase the first wireless device can transmit the frame above an indicated transmit power using the MCS.

Example 23 is an apparatus of a first wireless device, the apparatus including memory; and processing circuitry coupled to the memory, the processing circuitry configured to: encode a first trigger frame, the trigger frame including a first resource allocation for an uplink (UL) multi-user (MU) transmission for a plurality of second wireless devices; configure the first wireless device to transmit the trigger frame to the plurality of second wireless devices; decode a plurality of physical layer convergence protocol (PLCP) protocol data unit (PPDUs) from the plurality of second wireless device, the PPDUs each including a high-efficiency (HE) service field including a feedback in a physical (PHY) portion of the frame; and determine a second resource allocation for a second UL MU transmission based on the feedback in each of the PPDUs.

In Example 24, the subject matter of Example 23 optionally includes where the feedback comprises one or more of the following group: a MCS recommendation for a next UL MU transmission, a received quality of the trigger frame, a recommendation for a resource unit (RU) for a next UL MU transmission, a recommendation for the RU for a next downlink (DL) transmission to the first wireless device, the RU and scheduling information for the second wireless device to send a block acknowledgment (BA).

In Example 25, the subject matter of any one or more of Examples 23-24 optionally include transceiver circuitry coupled to the processing circuitry; and, one or more antennas coupled to the transceiver circuitry.

Example 26 is an apparatus of a first wireless device, the apparatus including: means for decoding a trigger frame from a second wireless device, where the trigger frame indicates a resource allocation for an uplink (UL) multi-user (MU) transmission for the first wireless device; means for determining feedback for the second wireless device based on the resource allocation; means for encoding a physical layer convergence protocol (PLCP) protocol data unit (PPDU) to include a high-efficiency (HE) service field including the feedback in a physical (PHY) portion of the PPDU; and means for configuring the first wireless device to transmit the PPDU in accordance with the resource allocation to the second wireless device.

In Example 27, the subject matter of Example 26 optionally includes where the apparatus further comprises: means for encoding the HE service field as part of a HE preamble field.

In Example 28, the subject matter of Example 27 optionally includes where the HE preamble field is a HE signal (SIG) C field, and where the HE preamble field is after a legacy preamble.

In Example 29, the subject matter of any one or more of Examples 26-28 optionally include where the apparatus further comprises: means for determining the feedback for the second wireless device based on the quality of the reception of the trigger frame.

In Example 30, the subject matter of any one or more of Examples 26-29 optionally include where the apparatus further comprises: means for finishing encoding the HE service field after the first wireless device begins transmitting a legacy preamble portion of the PPDU.

In Example 31, the subject matter of any one or more of Examples 26-30 optionally include where the apparatus further comprises: means for finishing encoding the HE service field between a first time that is a short interframe space (SIFS) after the first wireless device finishes receiving the trigger frame and a second time that is before the first wireless device begins transmitting the HE service field.

In Example 32, the subject matter of any one or more of Examples 26-31 optionally include where the HE service field is from 3 to 8 bits in length.

In Example 33, the subject matter of any one or more of Examples 26-32 optionally include where the PPDU is an UL trigger-based (TB) PPDU.

In Example 34, the subject matter of any one or more of Examples 26-33 optionally include where the apparatus further comprises: means for determining a cyclic redundancy code (CRC) for the HE service field and encode the HE service field to further comprise the CRC.

In Example 35, the subject matter of any one or more of Examples 26-34 optionally include where the apparatus further comprises: means for configuring the first wireless device to transmit the frame in accordance with the resource allocation a short interframe space (SIFS) after the first wireless device is to finish receiving the trigger frame.

In Example 36, the subject matter of any one or more of Examples 26-35 optionally include where the resource allocation comprises: a resource unit (RU) allocation, a modulation and coding scheme (MCS), and a spatial stream (SS) allocation.

In Example 37, the subject matter of Example 36 optionally includes where the apparatus further comprises: means for determining the feedback to be an indication of a headroom, the headroom indicating an amount of power increase the first wireless device can transmit the PPDU above an indicated transmit power using the MCS.

In Example 38, the subject matter of any one or more of Examples 36-37 optionally include where the apparatus further comprises: means for determining the feedback to be an indication of a headroom, the headroom indicating an amount of transmit power the first wireless device can transmit the frame above an indicated transmit power using the MCS and with the amount of transmit power being within Error Vector Magnitude (EVM) requirements of the first wireless device.

In Example 39, the subject matter of any one or more of Examples 26-38 optionally include where the feedback comprises one or more of the following group: a MCS recommendation for a next UL MU transmission, a received quality of the trigger frame, a recommendation for a resource unit (RU) for a next UL MU transmission, a recommendation for the RU for a next downlink (DL) transmission to the first wireless device, the RU and scheduling information for the second wireless device to send a block acknowledgment (BA).

In Example 40, the subject matter of any one or more of Examples 26-39 optionally include where the first wireless device and the second wireless device are each one from the following group: an Institute of Electrical and Electronic Engineers (IEEE) 802.11ax access point, an IEEE 802.11ax station, an IEEE 802.11 station, and an IEEE 802.11 access point.

In Example 41, the subject matter of any one or more of Examples 26-40 optionally include where the apparatus further comprises: means for configuring the first wireless device to transmit the frame in accordance with the resource allocation to the second wireless device and in accordance with one or both of orthogonal frequency division multiple-access (OFDMA) or multi-user multiple-input multiple-output (MU-MIMO).

In Example 42, the subject matter of any one or more of Examples 26-41 optionally include means for processing radio signals.

In Example 43, the subject matter of Example 42 optionally includes means for receiving and transmitting radio signals coupled to the means for processing radio signals.

Example 44 is a non-transitory computer-readable storage medium that stores instructions for execution by one or more processors, the instructions to configure the one or more processors to cause an apparatus of a first wireless device to: encode a first trigger frame, the trigger frame including a first resource allocation for an uplink (UL) multi-user (MU) transmission for a plurality of second wireless devices; configure the first wireless device to transmit the trigger frame to the plurality of second wireless devices; decode a plurality of physical layer convergence protocol (PLCP) protocol data unit (PPDUs) from the plurality of second wireless device, the PPDUs each including a high-efficiency (HE) service field including a feedback in a physical (PHY) portion of the frame; and determine a second resource allocation for a second UL MU transmission based on the feedback in each of the PPDUs.

In Example 45, the subject matter of Example 44 optionally includes where the feedback comprises one or more of the following group: a MCS recommendation for a next UL MU transmission, a received quality of the trigger frame, a recommendation for a resource unit (RU) for a next UL MU transmission, a recommendation for the RU for a next downlink (DL) transmission to the first wireless device, the RU and scheduling information for the second wireless device to send a block acknowledgment (BA).

Example 46 is a method performed by an apparatus of a first wireless device, the method including: encoding a first trigger frame, the trigger frame including a first resource allocation for an uplink (UL) multi-user (MU) transmission for a plurality of second wireless devices; configuring the first wireless device to transmit the trigger frame to the plurality of second wireless devices; decoding a plurality of physical layer convergence protocol (PLCP) protocol data unit (PPDUs) from the plurality of second wireless device, the PPDUs each including a high-efficiency (HE) service field including a feedback in a physical (PHY) portion of the frame; and determining a second resource allocation for a second UL MU transmission based on the feedback in each of the PPDUs.

In Example 47, the subject matter of Example 46 optionally includes where the feedback comprises one or more of the following group: a MCS recommendation for a next UL MU transmission, a received quality of the trigger frame, a recommendation for a resource unit (RU) for a next UL MU transmission, a recommendation for the RU for a next downlink (DL) transmission to the first wireless device, the RU and scheduling information for the second wireless device to send a block acknowledgment (BA).

Example 48 is a apparatus of a first wireless device, the apparatus including: means for encoding a first trigger frame, the trigger frame including a first resource allocation for an uplink (UL) multi-user (MU) transmission for a plurality of second wireless devices; means for configuring the first wireless device to transmit the trigger frame to the plurality of second wireless devices; means for decoding a plurality of physical layer convergence protocol (PLCP) protocol data unit (PPDUs) from the plurality of second wireless device, the PPDUs each including a high-efficiency (HE) service field including a feedback in a physical (PHY) portion of the frame; and means for determining a second resource allocation for a second UL MU transmission based on the feedback in each of the PPDUs.

In Example 49, the subject matter of Example 48 optionally includes where the feedback comprises one or more of the following group: a MCS recommendation for a next UL MU transmission, a received quality of the trigger frame, a recommendation for a resource unit (RU) for a next UL MU transmission, a recommendation for the RU for a next downlink (DL) transmission to the first wireless device, the RU and scheduling information for the second wireless device to send a block acknowledgment (BA).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a first wireless device, the apparatus comprising:
   memory; and processing circuitry coupled to the memory, the processing circuitry configured to:
      decode a trigger frame from a second wireless device, wherein the trigger frame indicates a resource allocation for an uplink (UL) multi-user (MU) transmission for the first wireless device, wherein the resource allocation comprises a resource unit (RU) allocation, a modulation and coding scheme (MCS), and a spatial stream (SS) allocation, and wherein the RU allocation comprises a plurality of subcarriers;
      determine feedback for the second wireless device based on one or more of the resource allocation, a received quality of the trigger frame, and a received power of the trigger frame;
      encode a physical layer convergence protocol (PLCP) protocol data unit (PPDU) to include a high-efficiency (HE) service field comprising the feedback in a physical (PHY) layer portion of the PPDU; and configure the first wireless device to transmit the PPDU in accordance with the resource allocation to the second wireless device.

2. The apparatus of claim 1, wherein the processing circuitry is further configured to:
encode the HE service field as part of a HE preamble field.

3. The apparatus of claim 2, wherein the HE preamble field is a HE signal (SIG) C field, and wherein the HE preamble field is after a legacy preamble.

4. The apparatus of claim 1, wherein the processing circuitry is further configured to:
determine the feedback for the second wireless device based on the quality of the reception of the trigger frame.

5. The apparatus of claim 1, wherein the processing circuitry is further configured to:
finish encoding the HE service field after the first wireless device begins transmitting a legacy preamble portion of the PPDU.

6. The apparatus of claim 1, wherein the processing circuitry is further configured to:
finish encoding the HE service field between a first time that is a short interframe space (SIFS) after the first wireless device finishes receiving the trigger frame and a second time that is before the first wireless device begins transmitting the HE service field.

7. The apparatus of claim 1, wherein the HE service field is from 3 to 8 bits in length.

8. The apparatus of claim 1, wherein the PPDU is an UL trigger-based (TB) PPDU.

9. The apparatus of claim 1, wherein the processing circuitry is further configured to:
determine a cyclic redundancy code (CRC) for the HE service field and encode the HE service field to further comprise the CRC.

10. The apparatus of claim 1, wherein the processing circuitry is further configured to:
configure the first wireless device to transmit the frame in accordance with the resource allocation a short interframe space (SIFS) after the first wireless device is to finish receiving the trigger frame.

11. The apparatus of claim 1, wherein the processing circuitry is further configured to:
determine the feedback to be an indication of a headroom, the headroom indicating an amount of power increase the first wireless device can transmit the PPDU above an indicated transmit power using the MCS.

12. The apparatus of claim 1, wherein the processing circuitry is further configured to:
determine the feedback to be an indication of a headroom, the headroom indicating an amount of transmit power the first wireless device can transmit the frame above an indicated transmit power using the MCS and with the amount of transmit power being within Error Vector Magnitude (EVM) requirements of the first wireless device.

13. The apparatus of claim 1, wherein the feedback comprises one or more of the following group: a MCS recommendation for a next UL MU transmission, the received quality of the trigger frame, a recommendation for a resource unit (RU) for a next UL MU transmission, a recommendation for the RU for a next downlink (DL) transmission to the first wireless device, the RU and scheduling information for the second wireless device to send a block acknowledgment (BA).

14. The apparatus of claim 1, wherein the first wireless device and the second wireless device are each one from the following group: an Institute of Electrical and Electronic Engineers (IEEE) 802.11ax access point, an IEEE 802.11ax station, an IEEE 802.11 station, and an IEEE 802.11 access point.

15. The apparatus of claim 1, wherein the processing circuitry is configured to:
configure the first wireless device to transmit the frame in accordance with the resource allocation to the second wireless device and in accordance with one or both of orthogonal frequency division multiple-access (OFDMA) or multi-user multiple-input multiple-output (MU-MIMO).

16. The apparatus of claim 1, further comprising transceiver circuitry coupled to the processing circuitry.

17. The apparatus of claim 16, further comprising one or more antennas coupled to the transceiver circuitry.

18. The apparatus of claim 1, wherein the resource allocation further comprises one or more of the following: a transmit power to use for the MCS and a target received signal strength indicator (RSSI).

19. A non-transitory computer-readable storage medium that stores instructions for execution by one or more processors, the instructions to configure the one or more processors to cause an apparatus of a first wireless device to:
decode a trigger frame from a second wireless device, wherein the trigger frame indicates a resource allocation for an uplink (UL) multi-user (MU) transmission for the first wireless device, wherein the resource allocation comprises a resource unit (RU) allocation, a modulation and coding scheme (MCS), and a spatial stream (SS) allocation, and wherein the RU allocation comprises a plurality of subcarriers;
determine feedback for the second wireless device based on one or more of the resource allocation, a received quality of the trigger frame, and a received power of the trigger frame;
encode a physical layer convergence protocol (PLCP) protocol data unit (PPDU) to include a high-efficiency (HE) service field comprising the feedback in a physical (PHY) layer portion of the PPDU; and
configure the first wireless device to transmit the PPDU in accordance with the resource allocation to the second wireless device.

20. The non-transitory computer-readable storage medium of claim 19, wherein the resource allocation comprises a resource unit (RU) allocation and a modulation and coding scheme (MCS), and wherein the instructions further configure the one or more processor to cause the apparatus to:
determine the feedback to be an indication of a headroom, the headroom indicating an amount of power increase the first wireless device can transmit the frame above an indicated transmit power using the MCS.

21. A method performed by an apparatus, the method comprising:
decoding a trigger frame from a second wireless device, wherein the trigger frame indicates a resource allocation for an uplink (UL) multi-user (MU) transmission for the first wireless device, wherein the resource allocation comprises a resource unit (RU) allocation, a modulation and coding scheme (MCS), and a spatial stream (SS) allocation, and wherein the RU allocation comprises a plurality of subcarriers;
determining feedback for the second wireless device based on one or more of the resource allocation, a received quality of the trigger frame, and a received power of the trigger frame;

encoding a physical layer convergence protocol (PLCP) protocol data unit (PPDU) to include a high-efficiency (HE) service field comprising the feedback in a physical (PHY) layer portion of the PPDU; and configuring the first wireless device to transmit the PPDU in accordance with the resource allocation to the second wireless device.

22. The method of claim 21, wherein the resource allocation comprises a resource unit (RU) allocation and a modulation and coding scheme (MCS), and wherein the method further comprises:

determining the feedback to be an indication of a headroom, the headroom indicating an amount of power increase the first wireless device can transmit the frame above an indicated transmit power using the MCS.

23. An apparatus of a first wireless device, the apparatus comprising memory; and processing circuitry coupled to the memory, the processing circuitry configured to:

encode a first trigger frame, the trigger frame comprising a first resource allocation for an uplink (UL) multi-user (MU) transmission for a plurality of second wireless devices, wherein the first resource allocation comprises for each second wireless device of the plurality of second wireless devices a first resource unit (RU) allocation, a first modulation and coding scheme (MCS), and a first spatial stream (SS) allocation, and wherein the RU allocation comprises a plurality of subcarriers;

configure the first wireless device to transmit the trigger frame to the plurality of second wireless devices;

decode a plurality of physical layer convergence protocol (PLCP) protocol data unit (PPDUs) from the plurality of second wireless device, the PPDUs each comprising a high-efficiency (HE) service field comprising a feedback in a physical (PHY) layer portion of the frame; and determine a second resource allocation for a second UL MU transmission based on the feedback in each of the PPDUs, wherein the second resource allocation comprises for each second wireless device of the plurality of second wireless devices a second resource unit (RU) allocation, a second modulation and coding scheme (MCS), and a second spatial stream (SS) allocation.

24. The apparatus of claim 23, wherein the feedback comprises one or more of the following group: a MCS recommendation for a next UL MU transmission, a received quality of the trigger frame, a recommendation for a resource unit (RU) for a next UL MU transmission, a recommendation for the RU for a next downlink (DL) transmission to the first wireless device, the RU and scheduling information for the second wireless device to send a block acknowledgment (BA).

25. The apparatus of claim 23, further comprising transceiver circuitry coupled to the processing circuitry; and, one or more antennas coupled to the transceiver circuitry.

* * * * *